3,438,909
METHOD OF PRODUCING FLEXIBLE
EPOXY RESINS
Wolfgang Kleeberg, Munich, Hans Denk, Gauting, near Munich, and Klaus-Robert Hauschildt, Munich, Germany, assignors to Siemens Aktiengesellschaft, Munich, Germany
No Drawing. Filed June 24, 1963, Ser. No. 290,209
Claims priority, application Germany, June 26, 1962,
S 80,075
Int. Cl. C08g 30/12, 30/10
U.S. Cl. 260—2                                    1 Claim The invention disclosed herein is concerned with a method of producing flexible moldable epoxy resins which are particularly adapted for use as insulating- or forming materials for electro-technical purposes.

Known epoxy resins based upon glycidyl ethers of multivalent alcohols or multivalent phenols as, for example, bisphenol A, or based upon aromatic glycidyl amines or epoxydised olefins or epoxy-modified Novolaks, form, upon hardening with aliphatic polyamines, for example, diethylenetriamine, triethylenetetramine or acid anhydride, for example, phthalic acid anhydride or its hydration products, in the final condition, rigid substances with high E-modul ($\geq$35,000 kg./cm.$^2$) and slight impact strength (about 10 cmkg./cm.$^2$). The use of the substances as forming materials, moldable resins, impregnating or coating agents, is by these properties greatly limited. Moreover, bodies surrounded with the indicated or with corresponding epoxy resin-hardening combinations, are already during the hardening subjected to strong pressure forces, owing to the reduction of volume which occurs thereby, and such pressure forces can in the case of pressure-sensitive electrical components result in functional disturbances or in the case of electrical circuits, in breakage of conductors. Tensile and compression stresses may in the presence of substantial temperature changes likewise occur, based upon different thermal expansion coefficients of the surrounded and surrounding materials, which can again adversely affect the surrounded body or the surrounding body and result in the formation of cracks.

Various attempts have been made to overcome these drawbacks. For example, attempts have been made to impart flexibility to the epoxy resins by addition of softening substances of low molecular or polymer nature, which either remain capable of migration or can be built into the epoxy resin over functional groups, for instance, polyethylene, polypropylene glycols and thiokols. It was also attempted to obtain flexible properties by the use of hardening components which are to a certain extent capable of flexibility, for example, polyamenoamides based upon dimevised, unsaturated, long-chain fatty acids or certain acid anhydrides having long aliphatic side chains, for example, dodecenylsuccinic acid anhydride.

The flexibility effect of epoxy resin systems is slight upon using the above referred to or similar substances, for example, upon using acid anhydrides of the type of dodecenylsuccinic acid anhydride or upon adding softeners which are not capable of anchoring in the epoxy resin system, when such substances are applied in concentrations such that a noticeable emigration of the softener is avoided. In the event that a greater flexibility effect is to be obtained in the above indicated procedures, for example, in the case of polyamide amine or thiokol, by using a greater proportion of softener, there will occur, with increasing flexibility an increased water absorption with attendent considerable drop of the insulating properties, and also frequently observed increase of corrosion tendency as well as increasing undesirable changes due to thermal aging.

The problem and object underlying the invention resides in developing a method which enables production of epoxy resins with increased flexibility, which can be adjusted as desired, and which do not have the previously indicated drawbacks. The method according to the invention comprises, reacting acid esters (which exhibit in the molecule at least two- preferably three or more- carboxyl functions and which have as important molecule elements, aliphatic chains with a member number of at least four, which may in given cases be linked by ester or ether compounds) with di- or poly-epoxy combinations or a mixture of di- or poly-epoxyd combinations, if desired together with dicarboxylic acid anhydrides and in the presence of known accelerators, filling substances and oxidation stabilizers, and with the application of heat. It is particularly advantageous to use a mixture of the named acid esters and one or more dicarboxylic acid anhydrides, containing the dicarboxylic acid anhydrides in a molecular mixing ratio of acid ester to acid anhydride, of 1:1 or smaller, wherein the molecular ratio of carbonyl functions, which are in the acid ester free while being latent in the dicarboxylic acid anhydride or the dicarboxylic acid anhydride mixture, to the epoxy group concentration, lies between 1.5 to 1 and 2 to 1.

According to the invention, substances are used as acid esters which can be produced in known manner, by reaction of dicarboxylic acid or dicarboxylic acid anhydrides with compounds with at least two alcoholic hydroxyl groups in the molecule. It is thereby important that the employed dicarboxylic acids or dicarboxylic acid anhydrides and/or the hydroxyl compounds, contain aliphatic chains with a member number of at least four, which may also contain hetero atoms as chain members and which may be linked, in the case of hydroxyl compounds, by ester- or ether compounds, functioning as elements for linking the carboxyl- or hydroxyl functions, respectively.

As examples for such acid esters to be used according to the invention, may be noted the following:

(1) Esterifying products of castor oil with dicarboxylic anhydrides, the latter for esterifying with respect to functionality, in an amount preferably at least twice equivalent to a hydroxyl concentration present in the castor oil. Suitable as dicarboxylic acid anhydrides are, for example, succinic acid anhydride, phthalic acid anhydride, hexahydrophthalic acid anhydride, tetrahydrophthalic acid anhydride, 3.6 - endomethylenetetrahydrophthalic acid anhydride, HET acid anhydride, methylnadic acid anhydride, dodecenylsuccinic acid anhydride.

(2) Analogous esterifying products from a low molecular, aliphatic hydroxylpolyester-produced, for example, of 2 moles adipic acid, 1 mole diethylene glycol and 2 moles hexanetriol and the above indicated dicarboxylic acid anhydrides.

(3) Analogous esterifying products from a glycol, such as neopentyl glycol, butylene glycol, diethylene glycol, 1.4-dimethylolcyclohexane and succinic acid anhydride or dodecenylsuccinic acid anhydride.

(4) Analogous esterifying products of glycerin or an hexanetriol and succinic acid anhydride or dodecenylsuccinic acid anhydride.

(5) Esterifying products of glycerin and/or an hexanetriol with adipic acid or sebacic acid or a mixture of these acids, wherein the mole ratio of acid for the esterifying to the triol amounts preferably to 3:1, the esterifying being in this case carried to a point at which the acid index of the esterifying mixture corresponds to 3- times the acid ester.

The action of such acid esters with respect to flexibility is obviously based upon the increase of the spacing between the interlinking points of a hardened epoxy resin due to the building-in of flexible aliphatic chain elements. Upon producing flexible epoxy resins by the use of acid esters, longer aliphatic side chains are built into the hardening epoxy resin system as elements producing flexibility. This is effected by reacting carboxylic acids or carboxylic anhydrides having more than two carboxyl functions open or latent in the molecule, with such an amount of a mono-functional longer-chain aliphatic alcohol, so that the obtained ester has at least two carboxyl functions in the molecule, and using such acid esters in intermixture with dicarboxylicacidanhydrides for the hardening reaction of a di- or polyepoxy compound. However, action of such acid esters with respect to flexibility is quite slight. Moreover, these acid esters, when used with a carbon chain number of at least twelve, for increasing the action of aliphatic alcohols with respect to increasing the flexibility, are miscible with epoxy resins only to a limited extent.

Insofar as the principle is concerned, the production of acid esters as intermediate products can be dispensed with, in all cases in which the acid esters can be produced by reaction between a di- or polycarboxylic acid anhydride and a compound containing alcoholic hydroxyl groups, and formation thereof from the initial components can be effected in the presence of further dicarboxylic acid anhydride directly during the hardening reaction with a di- or poly-epoxy compound. While such a procedure is possible, it does not result in the production of highgrade materials, with respect to mechanical and electrical qualities, as may be obtained upon applying the acid esters as defined substances with practically theoretical acid number or in the form of a mixture of the di- or polyol and dicarboxylic acid anhydride required for the ester production and esterified to at least 50 percent, in the latter case proportionally calculated according to the theoretical acid number of the acid ester to be produced.

Upon using acid esters or partially esterified di- or polyoldicarboxylic acid anhydrides together with further dicarboxylic acid anhydrides as hardening components for di- or poly-epoxy compounds, there will be obtained the further advantage that the mixtures of hardening components remain at room temperature fluid to viscous without tendency to crystallication, even upon using a number of dicarboxylic acid anhydrides which are solid at room temperature.

The acid esters are preferably used in the form of their initial components when it is desired that the viscosity of the workable epoxy resin-hardening mixture is to be as slight as possible. However, a sufficient miscibility of the substances which are to be combined in such case, is not always present, for example, when castor oil is used as hydroxyl component of the acid ester which is to be formed.

Since the acid esters react in known manner with epoxy groups, in an additive reaction, over the carboxyl groups, they are upon correctly selected concentration ratios of epoxy compound to acid ester or of epoxy compound to acid ester and dicarboxylic acid anhydride, completely built into the hardening system. They thus represent hardening components which produce, with two carboxyl functions per molecule, linear substances, while producing with three or more carboxyl functions per molecule interlaced substances. Substances which are with respect to their properties particularly valuable, are obtained upon reacting, according to a further feature of the invention, acid esters in intermixture with dicarboxylic acid anhydrides with di- or poly-epoxy compounds. Materials having a consistency ranging from rubber-like to rigid, with increased impact strength and an E-modul of approximately 500 kg./cm.$^2$ up to $\geq$30,000 kg./cm.$^2$, can be produced, depending upon the acid ester employed as well as upon its mixing ratio with dicarboxylic acid anhydrides and, in given cases, also filler material.

The flexible epoxy resins produced according to the invention exhibit very good electrical insulating properties, very slight water absorption, no corrosion under the action of hot moisture and electrical voltage, very slight alteration as to properties under the influence of heat, and high resistance to abrupt temperature changes. Moreover epoxy resin combinations can be extraordinarily economically produced with a whole series of the acid esters noted herein.

The combination with various poly-epoxy compounds is possible. Upon using glycidether as di- or poly-epoxy compounds, which can be produced by reaction of bisphenols (for example, bisphenol A) with epichlorohydrin with splitting of hydrogen chloride in the presence of alkali hydroxide, preferably with an epoxy value around 0.5, there will be obtained moldable resins which harden at temperatures varying from moderately warm to hot. However, upon using glycidyl amines for di- or polyepoxy compounds, obtained by reaction of aromatic amines, for example, 4,4-diaminodiphenylmethane with epichlorohydrin in the presence of alkali hydroxide, there will be surprisingly obtained moldable resins which harden at temperatures varying from cold to warm. It is accordingly possible, by a combination of mixtures of poly-epoxy compounds of glycidyl ether and glycidyl amine type with mixtures of acid esters and dicarboxylic acid anhydrides, to produce systems which can be hardened under very economical and readily applicable conditions within a temperature range from room temperature to above 120° C. Moreover, such systems are in the processing physiologically far less risky and do not require elaborate safety measures and devices for the operating personnel, such as are necessary upon using aliphatic or aromatic polyamine hardeners, on account of high vapor pressure and health-affecting actions of these substances.

The flexible epoxy resins produced according to the invention can be advantageously used as moldable resins, laminated resins, cements, impregnating- or coating means for electrical devices, especially for the production of formed bodies or for embedding, impregnating or coating electrical components or component groups.

The mechanical and electrical properties of some of the flexible epoxy resins which can be produced according to the invention are noted in the following examples of embodiments.

The percentages given in the examples are percentages by weight, unless otherwise specified.

Example 1

100 g. of a bisglycidyl ether based on bisphenol A, with an epoxy value of 0.5 mole epoxy per 100 g. substance, are at 80° C. homogeneously mixed with 250 g. of the acid ester (acid number=107 mg. KOH/1 g. substance)—produced by esterifying of 1 mole castor oil with 3 moles hexahydrophthalic acid anhydride and are at such temperature degased at 1 torr 15 minutes. After addition of 1 percent N,N-dimethylbenzylamine (for warm hardening) or 0.2 percent N,N-dimethylbenzylamine (for hot hardening), the mixture is cooled to 60° C., and is then moldable.

Viscosity of the mixture at 60° C.: 1700 cp.
Time for doubling the initial viscosity for warm hardening (1 percent accelerator): 2 hours.
Hardening conditions:
  Warm hardening—60° C./100 hours
  Hot hardening—120° C./20 hours

PROPERTIES OF THE HARDENED RESINS

| Property | DIN-Spec'n (meas'g rqu't) | Dimension | Number Value |
|---|---|---|---|
| Bending strength * | 53452 | Kg./cm.$^2$ | Unbroken. |
| Bending angle * | 53452 | Degree | 76. |
| Impact strength * | 53453 | Cmkg./cm.$^2$ | Unbroken. |
| Temp. form constancy acc'd to Martens. | 53458 | ° C | < 20° C. (room temperature). |
| Water absorption | Dynstat sample, 6 mo. at 20° C. | Percent | 1.2 (saturation value). |
| Spec. resistance | at 25° C. & 1 kc | Ohm-cm | 1·10$^{15}$. |
| Dielectric constant | at 25° C. & 1 kc | | 4.3. |
| | at 25° C. & 1 mc | | 4.0. |
| Diel. loss Factor | at 25° C. & 1 kc | | 0.03. |
| | at 25° C. & 1 mc | | 0.02. |
| E-corrosion | DIN 53489 | | A 1.2–A1.2. |

* Measured on Dynstat samples.

Example 2

100 g. of a bisglycidyl ether based on bisphenol A, with an epoxy value of 0.5 mole epoxy per 100 g. substance, are at 80° C. homogeneously mixed with 64 g. dodecenylsuccinic acid anhydride and 150 g. of the acid ester (acid number=89 mg. KOH/1 g. substance)—produced by esterifying 100 moles castor oil with 3 moles dodecenylsuccinic acid anhydride and degased at such temperature at 1 torr 15 minutes. After addition of 1 percent N,N-dimethylbenzylamine (for warm hardening) or 0.02 percent N,N-dimethylbenzamine (for hot hardening), the mixture is cooled to 60° C. and is then moldable.

Viscosity of the mixture at 60° C.: 600 cp.
Time for doubling the initial viscosity upon warm hardening (1 percent accelerator): 65 minutes.
Hardening conditions:
  Warm hardening—60° C./100 hours
  Hot hardening—120° C./20 hours

PROPERTIES OF THE HARDENED RESINS

| Property | DIN-Spec'n (meas'g rqu't) | Dimension | Number Value |
|---|---|---|---|
| Bend'g strength * | 53452 | Kg./cm.$^2$ | Unbroken. |
| Bend'g angle * | 53452 | Degree | 75. |
| Impact strength | 53453 | Cmkg./cm.$^2$ | Unbroken. |
| Temp. form constancy acc'd to Martens. | 53458 | ° C | < 20° C. (room temperature). |
| Water absorption | Dynstat sample, 6 mo. at 20° C. | Percent | 0.7 (saturation value). |
| Spec. resistance | at 25° C. & 1 kc | Ohm-cm | 2.6 · 10$^{15}$. |
| Diel. constant | at 25° C. & 1 kc | | 3.5. |
| | at 25° C. & 1 mc | | 3.2. |
| Diel. loss factor | at 25° C. & 1 kc | | 0.042. |
| | at 25° C. & 1 mc | | 0.018. |
| E-corrosion | DIN-53489 | | A1-A1. |

* Measured on Dynstat samples.

Example 3

100 g. of a bisglycidyl ether based on bisphenol A, with an epoxy value of 0.5 mole epoxy per 100 g. substance are homogeneously mixed at 120° C., with 35 g. phthalic acid anhydride and 122 g. of the acid ester (acid number=109 mg. KOH/1 g. substance)—produced by esterifying 1 mole castor oil with 3 mole phtalic acid anhydride and degased at such temperature at 1 torr 5 minutes. After addition of 0.2 percent N,N-dimethylbenzylamine, the mixture is cooled and poured into molds heated to 120° C.

Viscosity of the mixture at 120° C.: 200 cp.
Time for doubling the initial viscosity at 120° C.: About 10 minutes.
Hardening conditions: 120° C./20 hours.

PROPERTIES OF THE HARDENED RESIN

| Property | DIN-Spec'n (meas'g rqu't) | Dimension | Number Value |
|---|---|---|---|
| Bend'g strength * | 53452 | Kg./cm.$^2$ | Unbroken. |
| Bend'g angle * | 53452 | Degree | 60. |
| Impact strength * | 53453 | Cmkg./cm.$^2$ | Unbroken. |
| Temp. form constancy acc'd to Martens. | 53458 | ° C | < 20° C. (room temperature). |
| Water absorption | Dynstat sample 6 mo. at 20° C. | Percent | 0.55 (saturation value). |
| Spec. resistance | at 25° C. & 1 kc | Ohm-cm | 1·10$^{15}$. |
| Diel. constant | at 25° C. & 1 kc | | 3.5. |
| | at 25° C. & 1 mc | | 3.2. |
| Diel. loss factor | at 25° C. & 1 kc | | 0.024. |
| | at 25° C. & 1 mc | | 0.020. |
| E-corrosion | DIN-53489 | | A1-A1. |

* Measured on Dynstat samples.

Example 4

100 g. of a bisglycidyl ether based upon bisphenol A with an epoxy value of 0.5 mole epoxy per 100 g. substance are at 80° C. homogeneously mixed with 58 g. hexahydraphthalic acid anhydride and 50 g. of the acid ester (acid number=107 mg. KOH/1 g. substance)—produced by esterifying 1 mole castor oil with 3 mole hexahydrophthalic acid anhydride and degased at such temperature at 1 torr 15 minutes. The mixture is, after addition thereto of 1 percent N,N-dimethylbenzylamine (for warm hardening) or 0.2 percent N,N-dimethylbenzamine (for hot hardening), and cooling to 60° C., moldable.

Viscosity of the mixture at 60° C.: 450 cp.
Time for doubling the initial viscosity upon warm hardening (1 percent accelerator): 30 minutes.
Hardening conditions:
  Warm hardening—60° C. & 100 hours
  Hot hardening—120° C./20 hours

PROPERTIES OF THE HARDENED RESIN

| Property | DIN-Spec'n (meas'g rqu't) | Dimension | Number Value |
|---|---|---|---|
| Bend'g strength * | 53452 | Kg./cm.$^2$ | 1,550. |
| Bend'g angle * | 53452 | Degree | 23. |
| Impact strength * | 53453 | Cmkg./cm.$^2$ | 16. |
| Temp. form constancy acc'd to Martens. | 53458 | ° C | 75. |
| Water absorption | Dynstat sample 6 mo. at 20° C. | Percent | 0.50 (saturation value). |
| Spec. resistance | at 25° C. & 1 kc | Ohm-cm | 2·10$^{15}$. |
| Diel. constant | at 25° C. & 1 kc | | 3.6. |
| | at 25° C. & 1 mc | | 3.3. |
| Diel. loss factor | at 25° C. & 1 kc | | 0.007. |
| | at 25 C. & 1 mc | | 0.009. |
| E-corrosion | DIN-53489 | | A1-A1. |

* Measured on Dynstat samples.

Example 5

100 g. of a bisglycidyl amine based on diaminodiphenylmethane with an epoxy value of 0.5 mole epoxy per 100 g. substance are at 80° C. homogeneously mixed with 36 g. hexahydrophthalic acid anhydride and 125 g. of the acid ester (acid number=107 mg. KOH/1 g. substance)—produced by esterifying 1 mole castor oil with 3 mole hexahydrophthalic acid anhydride and degased at such temperature at 1 torr 15 minutes. The mixture can be poured or molded at 60° C. and can be hardened cold to warm or hot.

Viscosity of the mixture at 60° C.: 800 cp.
Time for doubling the initial viscosity at 60° C.: 15 minutes.

Hardening conditions:
    Cold—RT/24 hours and 60° C./6 hours
    Warm—60° C./20 hours
    Hot—120° C./2 hours.

PROPERTIES OF THE HARDENED RESIN

| Property | DIN-Spec'n (meas'g rqu't) | Dimension | Number Value |
|---|---|---|---|
| Bend'g strength * | 53452 | Kg./cm.$^2$ | Unbroken. |
| Bend'g angle * | 53452 | Degree | 73. |
| Impact strength * | 53453 | Cmkg./cm.$^2$ | Unbroken. |
| Temp. form constancy accd'g to Martens. | 53458 | ° C | < 20° C. (room temperature). |
| Water absorption | Dnystat sample 6 mo. at 20° C. | Percent | 0.8 (saturation value). |
| Spec. resistance | at 25° C. & 1 kc | Ohm-cm | 4·10$^{14}$. |
| Diel. constant | at 25° C. & 1 kc | | 3.5. |
| | at 25° C. & 1 mc | | 3.0. |
| Diel. loss factor | at 25° C. & 1 kc | | 0.04. |
| | at 25° C. & 1 mc | | 0.02. |
| E-corrosion | DIN-53489 | | A1-A1. |

* Measured on Dynstat samples.

Example 6

100 g. of a bisglycidyl amine based on diaminodiphenylmethane with an epoxy value of 0.5 mole epoxy per 100 g. substance are at 80° C. homogeneously mixed with 64 g. dodecenylsuccinic acid anhydride and 150 g. of the acid ester (acid number=89 mg.KOH/g. substance)—produced by esterifying 1 mole castor oil with 3 moles dodecenylsuccinic acid anhydride and degased at such temperature at 1 torr 15 minutes. The mixture can be molded or poured at 60° C. and can be hardened cold to warm or hot.

Viscosity of the mixture at 60° C.: 800 cp.
Time for doubling the initial viscosity at 60° C.: 15 minutes.
Hardening conditions:
    Cold—RT/24 hours and 60° C./6 hours
    Warm—60° C./20 hours
    Hot—120° C./10 hours

PROPERTIES OF THE HARDENED RESIN

| Property | DIN-Spec'n (meas'g rqu't) | Dimension | Number Value |
|---|---|---|---|
| Bending strength * | 53452 | Kg./cm.$^2$ | Unbroken. |
| Bending angle * | 53452 | Degree | 76. |
| Impact strength * | 53453 | Cmkg./cm.$^2$ | Unbroken. |
| Temp. form constancy accd'g to Martens. | 53458 | ° C | < 20° c. (room temperature). |
| Water absorption | Dynstat sample 6 mo. at 20° C. | Percent | 0.8 (saturation value). |
| Spec. resistance | at 25° C. & 1 kc | Ohm-cm | 6.10$^{14}$. |
| Diel. constant | at 25° C. & 1 kc | | 3.2 |
| | at 25° C. & 1 mc | | 2.7 |
| Diel. loss factor | at 25° C. & 1 kc | | 0.05 |
| | at 25° C. & 1 mc | | 0.02 |
| E-corrosion | DIN-53489 | | A1-A1 |

* Measured on Dynstat samples.

Example 7

100 g. of a double epoxydized cycloaliphatic ester of the formula

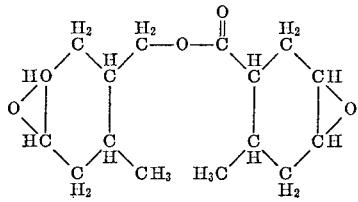

with an epoxy value of 0.7 mole epoxy per 100 g. substance are at 80° C. homogeneously mixed with 59 g. methyl-endomethylentetrahydrophthalic acid anhydride and 180 g. of the acid ester (acid number 130 mg. KOH/ 1 g. substance)—produced by esterifying 1 mole castor oil with 3 mole methyl-endomethylentetrahydrophthalic acid anhydride and degased at such temperature at 1 torr 5 minutes. After addition of 0.2 percent N,N-dimethylbenzamine and cooling to 60° C., the mixture is ready for molding or pouring.

Viscosity of the mixture at 60° C.: 200 cp.
Time for doubling the initial viscosity at 60° C.: 40 minutes.
Hardening conditions: Hot hardening—120° C./20 hours.

PROPERTIES OF THE HARDENED RESIN

| Property | DIN-Spec'n (meas'g rqu't) | Dimension | Number Value |
|---|---|---|---|
| Bend'g Strength * | 53452 | Kg./cm.$^2$ | Unbroken. |
| Bend'g Angle * | 53452 | Degree | 64. |
| Impact Strength * | 53453 | Cmkg./cm.$^2$ | Unbroken |
| Temp. form constancy accd'g to Martens. | 53458 | ° C | < 20° C. (room temperature). |
| Water absorption | Dystat sample 6 mo. at 20° C. | Percent | 1.3 (saturation value). |
| Spec. resistance | at 25° C. & 1 kc | Ohm-cm | 3·10$^{15}$. |
| Diel. constant | at 25° C. & 1 kc | | 3.5. |
| | at 25° C. & 1 mc | | 3.2. |
| Diel. loss factor | at 25° C. & 1 kc | | 0.02. |
| | at 25° C. & 1 mc | | 0.01. |
| E-corrosion | DIN-53489 | | A1-A1. |

*Measured on Dynstat samples.

Changes may be made within the scope and spirit of the appended claim which define what is believed to be new and desired to have protected by Letters Patent.

We claim:
1. A method for the manufacture of a flexible epoxy resin which comprises effecting a reaction of a mixture of (a) a component formed by at least 50% esterifying a mixture of castor oil with a dicarboxylic anhydride in a proportion such that the ratio of carboxylic equivalent to hydroxyl equivalent is greater than two to form an esterification product containing at least one aliphatic chain of at least four carbon atoms as an essential molecular element, and (b) at least one epoxy compound containing two epoxy groups in the molecule, the ratio of the total carboxylic equivalents to the epoxy groups being at least 1.5 and not greater than 2.

References Cited

UNITED STATES PATENTS

| | | | |
|---|---|---|---|
| 2,947,717 | 8/1960 | Belanger | 260—47 |
| 2,967,837 | 1/1961 | Greenfield | 260—47 |
| 3,099,683 | 7/1963 | Toombs | 260—2 |
| 2,700,024 | 1/1955 | Hughes et al. | 260—404.8 |
| 2,720,500 | 10/1955 | Cody | 260—76 |

WILLIAM H. SHORT, Primary Examiner.

T. PERTILLA, Assistant Examiner.

U.S. Cl. X.R.

260—18, 47